(12) United States Patent
Rajaram

(10) Patent No.: US 10,756,813 B1
(45) Date of Patent: Aug. 25, 2020

(54) BROADBAND SUBSCRIBER SWITCHOVER IN A RING NETWORK

(71) Applicant: Cisco Technology, Inc., San Jose, CA (US)

(72) Inventor: Narendiran Rajaram, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/402,736

(22) Filed: May 3, 2019

(51) Int. Cl.
| | |
|---|---|
| *H04B 10/038* | (2013.01) |
| *H04B 10/032* | (2013.01) |
| *H04B 10/079* | (2013.01) |
| *H04B 10/275* | (2013.01) |
| *H04L 12/28* | (2006.01) |
| *H04L 12/437* | (2006.01) |
| *G06F 11/30* | (2006.01) |

(52) U.S. Cl.
CPC ......... *H04B 10/038* (2013.01); *H04B 10/032* (2013.01); *H04B 10/0793* (2013.01); *H04B 10/275* (2013.01); *G06F 11/30* (2013.01); *H04L 12/28* (2013.01); *H04L 12/437* (2013.01)

(58) Field of Classification Search
CPC ................ H04B 10/038; H04B 10/032; H04B 10/0793; H04B 10/275; G06F 11/30; H04L 12/24; H04L 12/26; H04L 12/28; H04L 12/42; H04L 12/437; H04L 12/707; H04Q 11/00
USPC .................................................. 398/3, 45, 18
See application file for complete search history.

(56) References Cited

U.S. PATENT DOCUMENTS

| | | | | |
|---|---|---|---|---|
| 5,797,035 A | * | 8/1998 | Birrittella | G06F 15/17337 709/245 |
| 6,963,575 B1 | * | 11/2005 | Sistanizadeh | H04L 12/4625 370/401 |
| 8,611,740 B2 | * | 12/2013 | Grossman | H04B 10/032 398/11 |
| 9,001,644 B2 | * | 4/2015 | Salam | H04L 41/0677 370/222 |
| 9,258,215 B2 | * | 2/2016 | Hussain | H04L 1/0041 |
| 2002/0003639 A1 | * | 1/2002 | Arecco | H04J 14/022 14/22 |
| 2009/0214222 A1 | * | 8/2009 | Grossman | H04B 10/032 398/173 |
| 2010/0287405 A1 | * | 11/2010 | Soon | H04L 43/0811 714/4.1 |

(Continued)

*Primary Examiner* — Abbas H Alagheband
(74) *Attorney, Agent, or Firm* — Merchant & Gould P.C.

(57) ABSTRACT

Broadband subscriber switchover may be provided. First, a first gateway device may receive a first failure message from a first ring device. The first gateway device may be designated as an access fault detection agent among a plurality of gateway devices. Next, the first gateway device may receive a second failure message from a second ring device. The second failure message may be received via a second gateway device. The first ring device and the second ring device may be in an open-ring. Then the first gateway device may determine that the first ring device has been cut off from the second gateway device based upon the first failure message and the second failure message. The second gateway device may be a master device for the first ring device. The master device for the first ring device may then be switched from the second gateway device to the first gateway device.

16 Claims, 7 Drawing Sheets

(56) References Cited

U.S. PATENT DOCUMENTS

| | | | |
|---|---|---|---|
| 2010/0315946 A1* | 12/2010 | Salam | H04L 12/437 370/222 |
| 2011/0075554 A1 | 3/2011 | Holness | |
| 2011/0164493 A1* | 7/2011 | Bragg | H04L 12/4625 370/217 |
| 2012/0106360 A1* | 5/2012 | Sajassi | H04L 12/437 370/245 |
| 2012/0155484 A1* | 6/2012 | Sergeev | H04L 12/437 370/405 |
| 2013/0064071 A1* | 3/2013 | Bos | H04L 12/437 370/223 |
| 2013/0250753 A1 | 9/2013 | Shin | |
| 2014/0233369 A1* | 8/2014 | Salam | H04L 41/0677 370/218 |
| 2014/0321845 A1* | 10/2014 | Jiang | H04Q 11/0067 398/5 |
| 2015/0334004 A1* | 11/2015 | Hussain | H04Q 11/0003 398/5 |
| 2016/0197741 A1* | 7/2016 | Nahlous | H04L 12/437 370/223 |
| 2018/0324281 A1* | 11/2018 | Gupta | H04L 43/0876 |

\* cited by examiner

US 10,756,813 B1

BROADBAND SUBSCRIBER SWITCHOVER IN A RING NETWORK

TECHNICAL FIELD

The present technology relates to broadband subscriber switchover.

BACKGROUND

A ring network is a network topology in which each node connects to two other nodes, forming a continuous pathway for signals through each node. Data travels from node to node, with each node along the way handling every packet. Rings can be unidirectional (e.g., with the traffic travelling either clockwise or counterclockwise around the ring) or bidirectional (e.g., using Synchronous optical networking (SONET) and synchronous digital hierarchy (SDH)). SONET/SDH are standardized protocols that transfer multiple digital bit streams synchronously over optical fiber using lasers or highly coherent light from light-emitting diodes (LEDs).

Because a unidirectional ring topology provides only one pathway between any two nodes, unidirectional ring networks may be disrupted by the failure of a single link. A node failure or cable break might isolate every node attached to the ring.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
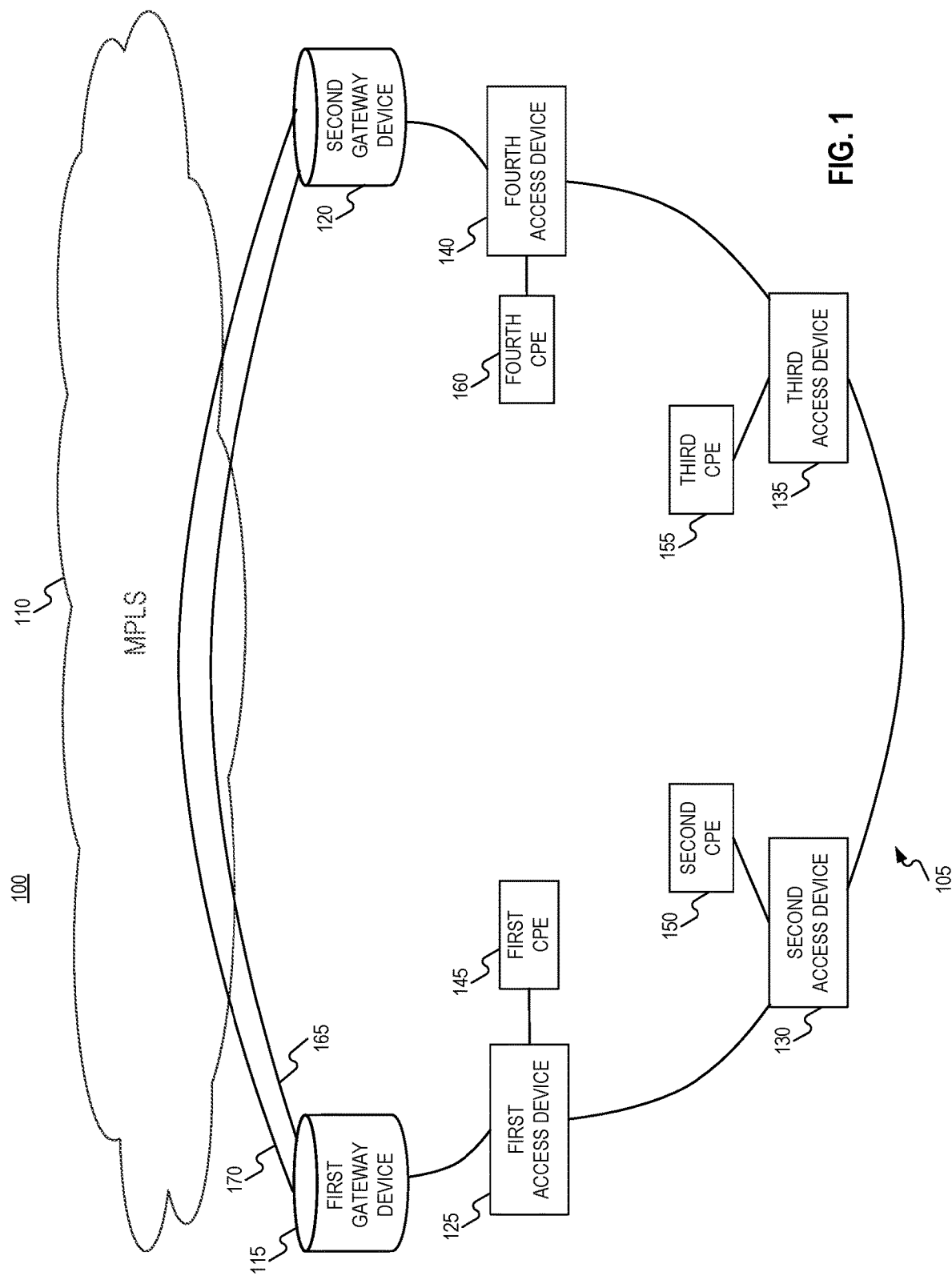
FIG. 1 is a block diagram of an operating environment for providing broadband subscriber switchover.

Broadband subscriber switchover may be provided. First, a first gateway device may receive a first failure message from a first ring device. The first gateway device may be designated as an access fault detection agent among a plurality of gateway devices in an open-ring. Next, the first gateway device may receive a second failure message from a second ring device. The second failure message may be received via a second gateway device in the plurality of gateway device. The first ring device and the second ring device may be in the open-ring. Then the first gateway device may determine that the first ring device has been cut off from the second gateway device based upon the first failure message and the second failure message. The second gateway device may be a master device for the first ring device. The master device for the first ring device may then be switched from the second gateway device to the first gateway device based on determining that the first ring device has been cut off from the second gateway device.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In providing broadband subscriber switchover, embodiments of the disclosure may designate a gateway device (e.g., a Broadband Network Gateway (BNG) device) as an "access fault detection agent" across two gateway devices that participate in a subscriber redundancy process. Ring devices (e.g., access nodes in an open-ring) and links on the gateway devices that may be connected to the ring devices may be configured in the G.8032 open-ring mode. The topology of the ring devices may be captured, for example, through a Command-Line Interface (CLI) or a graphical representation of ring device placement. In this way, the ring devices' system Media Access Control Address (MAC) addresses and which gateway device the ring devices are mastered to may be obtained. This information (e.g., topology of the ring devices) may be obtained, places in a topology database, and configured in the gateway devices.

FIG. 1 is a block diagram of an operating environment 100 for providing broadband subscriber switchover. As shown in FIG. 1, operating environment 100 may comprise an open-ring 105, a Multi-Protocol Label Switching (MPLS)/IP network 110, a plurality of gateway devices, and a plurality of access devices. Plurality of gateway devices may comprise a first gateway device 115 and a second gateway device 120. Plurality of access devices may comprise a first access device 125, a second access device 130, a third access device 135, and a fourth access device 140. First access device 125 may be connected to and may server first customer premises equipment (CPE) 145. Second access device 130 may be connected to and may server second CPE 150. Third access device 135 may be connected to and may server third CPE 155. And fourth access device 140 may be connected to and may server fourth CPE 160.

Operating environment 100 may further include a subscriber redundancy synchronization link 165 and a control channel 170. Subscriber redundancy synchronization link 165 may be used for synchronization of master/slave roles using Shared Risk Resource Group (SRG) protocol (e.g., Bi-directional Forwarding Detection (BFD) heartbeat). Consistent with embodiments of the disclosure, control channel 170 may convey, as described in greater detail below, Automatic Protection Switching (R-APS) messages to the gateway device designate as the access fault detection agent for resolution.

MPLS network 110 may employ MPLS that may comprise a type of data-carrying technique for high-performance telecommunications networks that directs data from one network node to the next based on short path labels rather than long network addresses, avoiding complex lookups in a routing table. The labels may identify virtual links (paths) between distant nodes rather than endpoints. MPLS may encapsulate packets of various network protocols. MPLS network 110, for example, may be an MPLS/IP network or a pure Internet Protocol (IP) network.

First gateway device 115 and second gateway device 120 may comprise Broadband Network Gateway (BNG) devices that may route traffic to and from plurality of access devices on, for example, an Internet service provider's (ISP) network. First gateway device 115 and second gateway device 120 may sit at the edge of MPLS network 110 and aggregate user sessions from open-ring 105. At first gateway device 115 and second gateway device 120 an ISP may subscriber inject policy management and IP Quality of Service (QoS).

Plurality of access devices may comprise ring devices connected in a ring topology. The ring devices may comprise, for example, Optical Line Terminals (OLTs). Each of the plurality of access devices may be connected to one or more customer premises that may include CPE. CPE may comprise, but are not limited to, devices such as telephones, routers, network switches, residential gateways (RG), set-top boxes, fixed mobile convergence products, home networking adapters, and Internet access gateways that may enable consumers to access a communications service providers' services and distribute them, for example, via a local area network (LAN).

Figure 2:
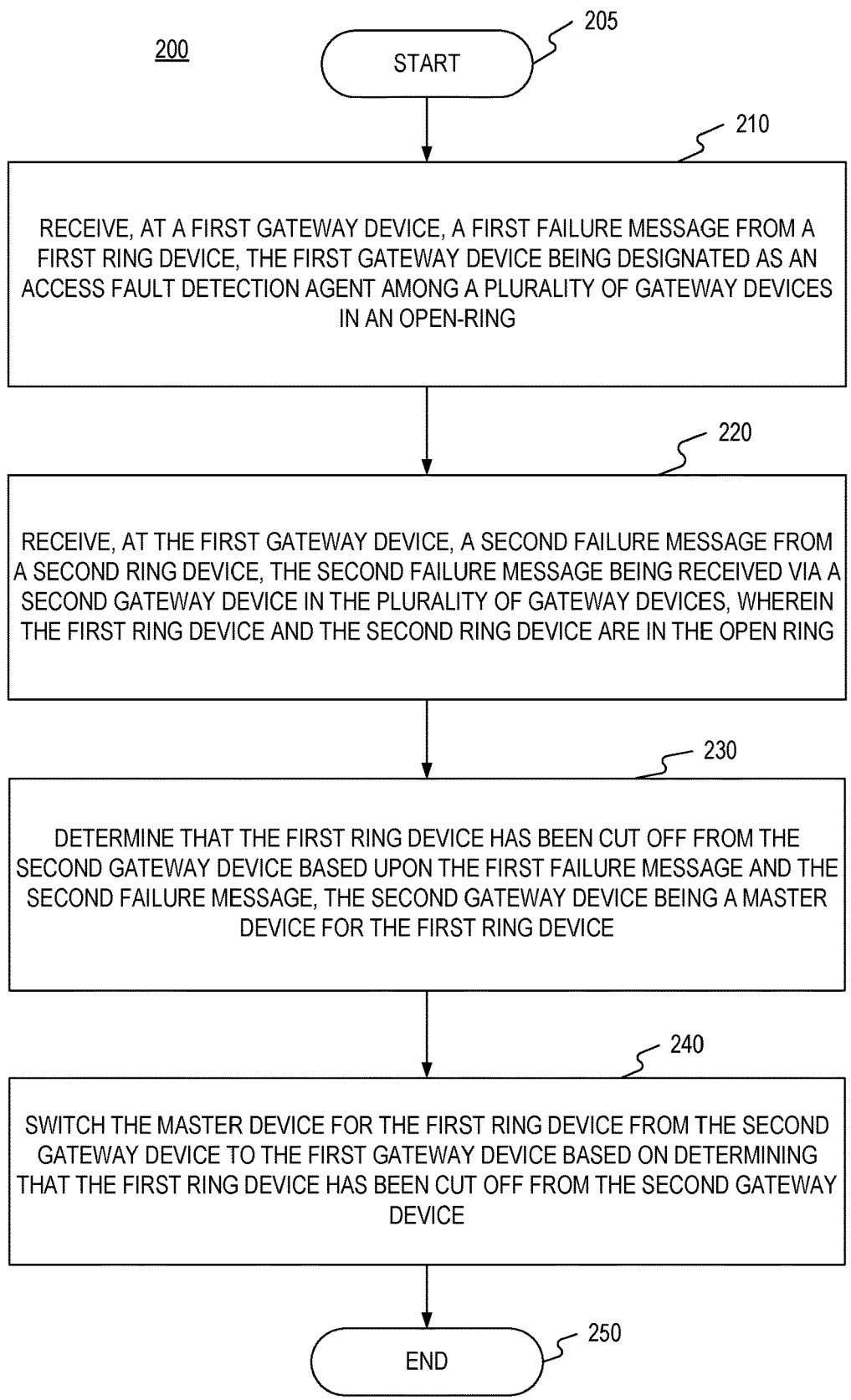
FIG. 2 is a flow chart of a method for providing broadband subscriber switchover.

FIG. 2 is a flow chart setting forth the general stages involved in a method 200 consistent with an embodiment of the disclosure for providing broadband subscriber switchover in a ring network. Because first gateway device 115 may be designated as the "access fault detection agent", method 200 may be implemented using first gateway device 115. Method 200 may be implemented using second gateway device 120 if it were designated as the access fault detection agent instead of first gateway device 115. A computing device 700, as described in more detail below with respect to FIG. 7, may comprise an operating environment for first gateway device 115. Ways to implement the stages of method 200 may be described in greater detail below.

Figure 3:
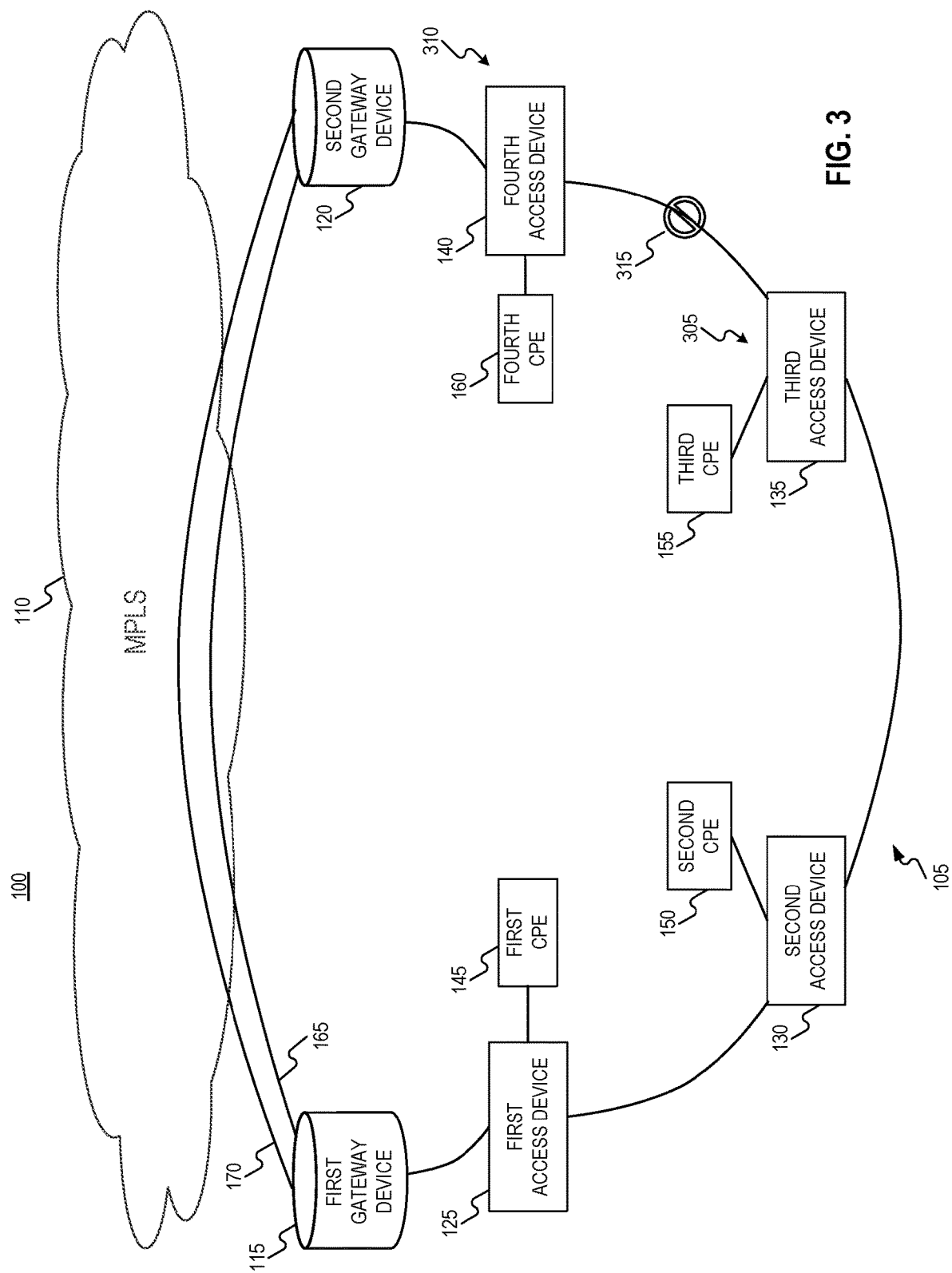
FIG. 3 is a block diagram of an operating environment for providing broadband subscriber switchover.

FIG. 3 is a block diagram of operating environment 100 and may be used to illustrate method 200. As shown in FIG. 3, third access device 135 may comprise a first ring device 305 and fourth access device 140 may comprise a second ring device 310. A fault 315 may occur in a segment (i.e., link) of open-ring 105 between first ring device 305 and second ring device 310 that interrupts communication between first ring device 305 and second ring device 310. For example, fault 315 may comprise a cut in this segment (e.g., a fiber cut) or failure of another access device (e.g., an OLT) located in open-ring 105 between first ring device 305 and second ring device 310 in this segment.

Method 200 may begin at starting block 205 and proceed to stage 210 where first gateway device 115 may receive a first R-APS message from first ring device 305 with MAC address 305. First gateway device 115 may be designated as the access fault detection agent among the plurality of gateway devices (i.e., first gateway device 115 and second gateway device 120) in open-ring 105. For example, when fault 315 happens, two access devices that share a common segment where fault 315 happened may detect segment failure. In this example, the two access devices may comprise first ring device 305 and second ring device 310.

First ring device 305 may detect no signals (e.g., no light signals in the case of a fiber optic cable) on this faulted segment. As a result, first ring device 305 may send the first failure message comprising an R-APS SF (signal failure) message to first gateway device 115 with MAC address 305. The first failure message may be sent to first gateway device 115 because first gateway device 115 may have been designated as the access fault detection agent. The first failure message may include the MAC address of first ring device 305 as a node identifier for first ring device 305 that detected fault 315. The first failure message may be sent to first gateway device 115 over open-ring 105 through second access device 130 and first access device 125.

From stage 210, where first gateway device 115 receives first failure message from first ring device 305, method 200 may advance to stage 220 where first gateway device 115 may receive a second failure message from second ring device 310. The second failure message may be received via second gateway device 120 in the plurality of gateway devices. For example, second ring device 310 may detect no signals (e.g., no light signals in the case of a fiber optic cable) on this faulted segment. As a result, second ring device 310 may send the second failure message comprising an R-APS SF (signal failure) message to first gateway device 115. The second failure message may be sent to first gateway device 115 because first gateway device 115 may have been designated as the access fault detection agent. The second failure message may include the MAC address of second ring device 310 as a node identifier for second ring device 310 that detected fault 315.

The second failure message may be sent to first gateway device 115 via second gateway device 120 through MPLS 110 over control channel 170. For example, second ring device 310 may not have a path to first gateway device 115 over open-ring 105 due to fault 315. As a result, second ring device 310 may send the second failure message to second gateway device 120. Because second gateway device 120 may know that first gateway device 115 is the access fault detection agent, second gateway device 120 may forward the second failure message to first gateway device 115 over control channel 170.

Once first gateway device 115 receives the second failure message from second ring device 310 in stage 220, method 200 may continue to stage 230 where first gateway device 115 may determine that first ring device 305 has been cut off from second gateway device 120 based upon the first failure message and the second failure message. For example, first gateway device 115 now has the first failure message and the second failure message (e.g., two R-APS SF messages) with node identifiers (e.g., MAC addresses) of access nodes that shared the common failed segment. As a result, first gateway device 115 may run switchover logic on a topology database of open-ring 105 to determinate whether broadband sessions attached to the effected access nodes (e.g., first ring device 305 and second ring device 310) need to be switched over to a peer gateway device due to fault 315. Second gateway device 120 may be a master device for first ring device 305 and therefore, broadband sessions for CPEs attached to first ring device 305 may be serviced by second gateway device 120. Because fault 315 may be between first ring device 305 and its master device (e.g., second gateway device 120) in the topology of open-ring 105, first gateway device 115 may determine that first ring device 305 has been cut off from its master device (e.g., second gateway device 120).

After first gateway device 115 determines that first ring device 305 has been cut off from second gateway device 120 in stage 230, method 200 may proceed to stage 240 where first gateway device 115 may switch the master device for first ring device 305 from second gateway device 120 to first gateway device 115 based on determining that first ring device 305 has been cut off from second gateway device 120. For example, because first gateway device 115 determined that first ring device 305 has been cut off from its master device (e.g., second gateway device 120), first gateway device 115 may switch the master device for first ring device 305 from second gateway device 120 to first gateway device 115. In this way, broadband sessions for CPEs attached to first ring device 305 may be serviced by first gateway device 115 because they can no longer be serviced by second gateway device 120 due to fault 315. Once first gateway device 115 switches the master device for first ring device 305 from second gateway device 120 to first gateway device 115 in stage 240, method 200 may then end at stage 250.

Figure 4:
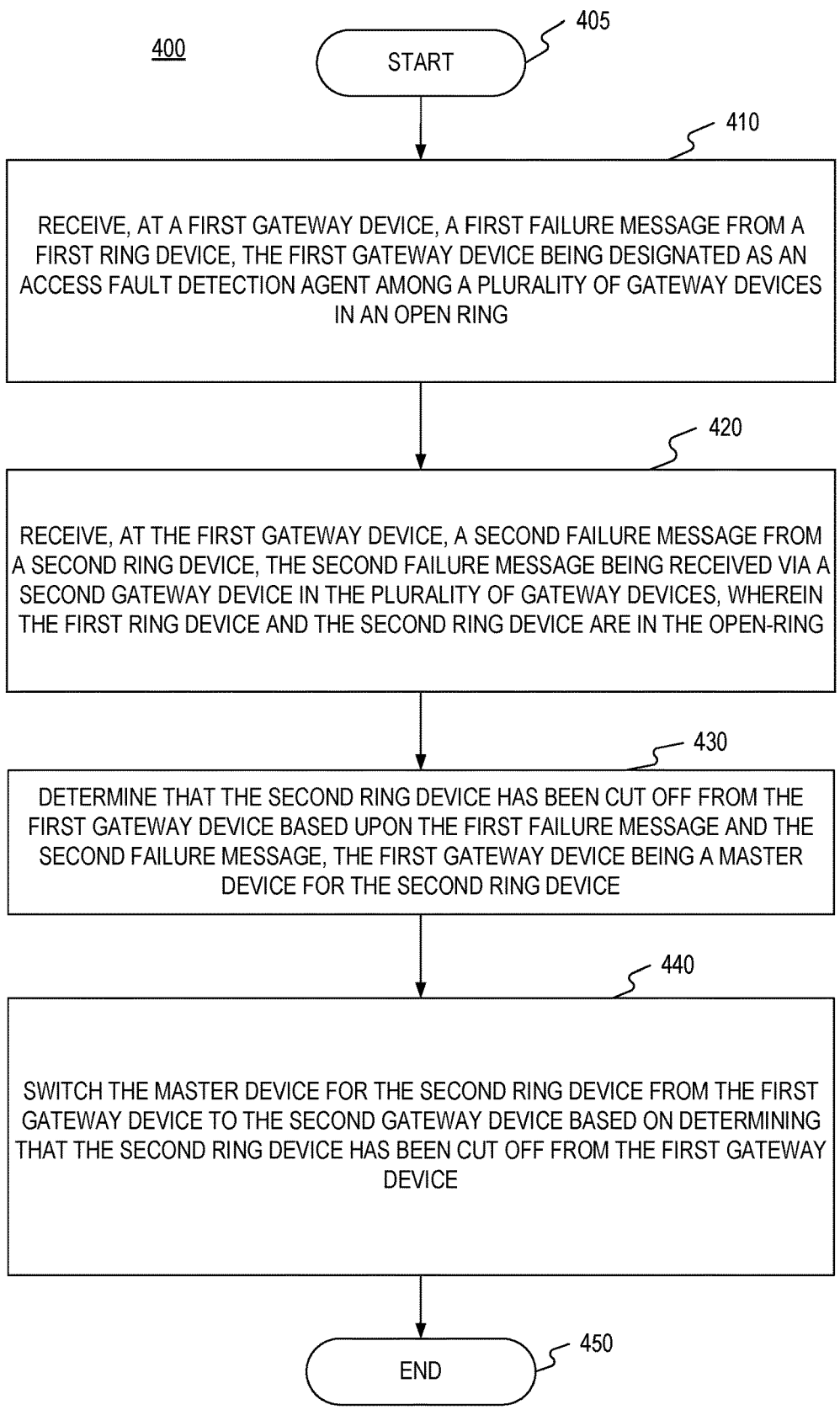
FIG. 4 is a flow chart of a method for providing broadband subscriber switchover.

FIG. 4 is a flow chart setting forth the general stages involved in a method 400 consistent with an embodiment of the disclosure for providing broadband subscriber switchover in a ring network. Because first gateway device 115 may be designated as the access fault detection agent, method 400 may be implemented using first gateway device 115. Method 400 may be implemented using second gateway device 120 if it were designated as the access fault detection agent instead of first gateway device 115. Computing device 700, as described in more detail below with respect to FIG. 7, may comprise an operating environment for first gateway device 115. Ways to implement the stages of method 400 may be described in greater detail below.

Figure 5:
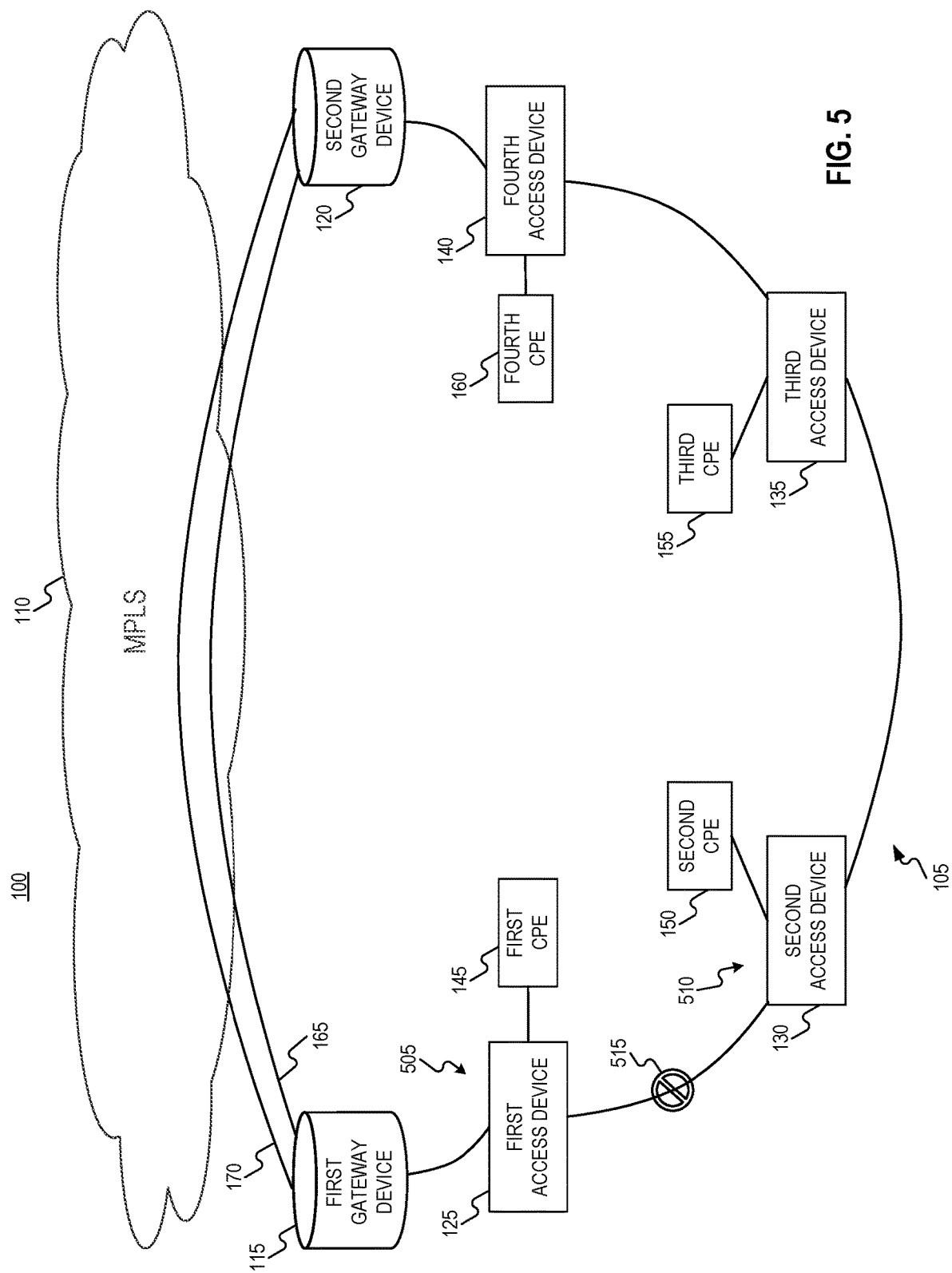
FIG. 5 is a block diagram of an operating environment for providing broadband subscriber switchover.

FIG. 5 is a block diagram of operating environment 100 and may be used to illustrate method 400. As shown in FIG. 5, first access device 125 may comprise a first ring device 505 and second access device 130 may comprise a second ring device 510. A fault 515 may occur in a segment of open-ring 105 between first ring device 505 and second ring device 510 that interrupts communication between first ring device 505 and second ring device 510. For example, fault 515 may comprise a cut in this segment (e.g., a fiber cut) or failure of another access device (e.g., an OLT) located in open-ring 105 between first ring device 505 and second ring device 510 in this segment.

Method 400 may begin at starting block 405 and proceed to stage 410 where first gateway device 115 may receive a first failure message from first ring device 505. First gateway device 115 may be designated as the access fault detection agent among the plurality of gateway devices (i.e., first gateway device 115 and second gateway device 120) in open-ring 105. For example, when fault 515 happens, two access devices that share a common segment where fault 515 happened may detect segment failure. In this example, the two access devices may comprise first ring device 505 and second ring device 510.

First ring device 505 may detect no signals (e.g., no light signals in the case of a fiber optic cable) on this faulted segment. As a result, first ring device 505 may send the first failure message comprising an R-APS SF (signal failure) message to first gateway device 115. The first failure message may be sent to first gateway device 115 because first gateway device 115 may have been designated as the access fault detection agent. The first failure message may include the MAC address of first ring device 505 as a node identifier for first ring device 505 that detected fault 515. The first failure message may be sent to first gateway device 115 over open-ring 105 via the segment between first ring device 505 and first gateway device 115.

From stage 410, where first gateway device 115 receives first failure message from first ring device 505, method 400 may advance to stage 420 where first gateway device 115 may receive a second failure message from second ring device 510. The second failure message may be received via second gateway device 120 in the plurality of gateway devices. For example, second ring device 510 may detect no signals (e.g., no light signals in the case of a fiber optic cable) on this faulted segment. As a result, second ring device 510 may send the second failure message comprising an R-APS SF (signal failure) message to first gateway device 115. The second failure message may be sent to first gateway device 115 because first gateway device 115 may have been designated as the access fault detection agent. The second failure message may include the MAC address of second ring device 510 as a node identifier for second ring device 510 that detected fault 515.

The second failure message may be sent to first gateway device 115 through third access device 135, fourth access device 140, and via second gateway device 120 through MPLS 110 over control channel 170. For example, second ring device 510 may not have a path to first gateway device 115 over open-ring 105 due to fault 515. As a result, second ring device 510 may send the second failure message to second gateway device 120. Because second gateway device 120 may know that first gateway device 115 is the access fault detection agent, second gateway device 120 may forward the second failure message to first gateway device 115 over control channel 170.

Once first gateway device 115 receives the second failure message from second ring device 510 in stage 420, method 400 may continue to stage 430 where first gateway device 115 may determine that second ring device 510 has been cut off from first gateway device 115 based upon the first failure message and the second failure message. For example, first gateway device 115 now has the first failure message and the second failure message (e.g., two R-APS SF messages) with node identifiers (e.g., MAC addresses) of access nodes that shared the common failed segment. As a result, first gateway device 115 may run switchover logic on the topology database of open-ring 105 to determinate whether broadband sessions attached to the effected access nodes (e.g., first ring device 505 and second ring device 510) need to be switched over to a peer gateway device due to fault 515. First gateway device 115 may be a master device for second ring device 510 and therefore, broadband sessions for CPEs attached to second ring device 510 may be serviced by first gateway device 115. Because fault 515 may be between second ring device 510 and its master device (e.g., first gateway device 115) in the topology of open-ring 105, first gateway device 115 may determine that second ring device 510 has been cut off from its master device (e.g., first gateway device 115).

After first gateway device 115 determines that second ring device 510 has been cut off from first gateway device 115 in stage 430, method 400 may proceed to stage 440 where first gateway device 115 may switch the master device for second ring device 510 from first gateway device 115 to second gateway device 120 based on determining that second ring device 510 has been cut off from first gateway device 115. For example, because first gateway device 115 determined that second ring device 510 has been cut off from its master device (e.g., first gateway device 115), first gateway device 115 may switch the master device for second ring device 510 from first gateway device 115 to second gateway device 120.

In this way, broadband sessions for CPEs attached to second ring device 510 may be serviced by second gateway device 120 because they can no longer be serviced by first gateway device 115 due to fault 515. Once first gateway device 115 switches the master device for second ring device 510 from first gateway device 115 to second gateway device 120 in stage 440, method 400 may then end at stage 450.

Figure 6:
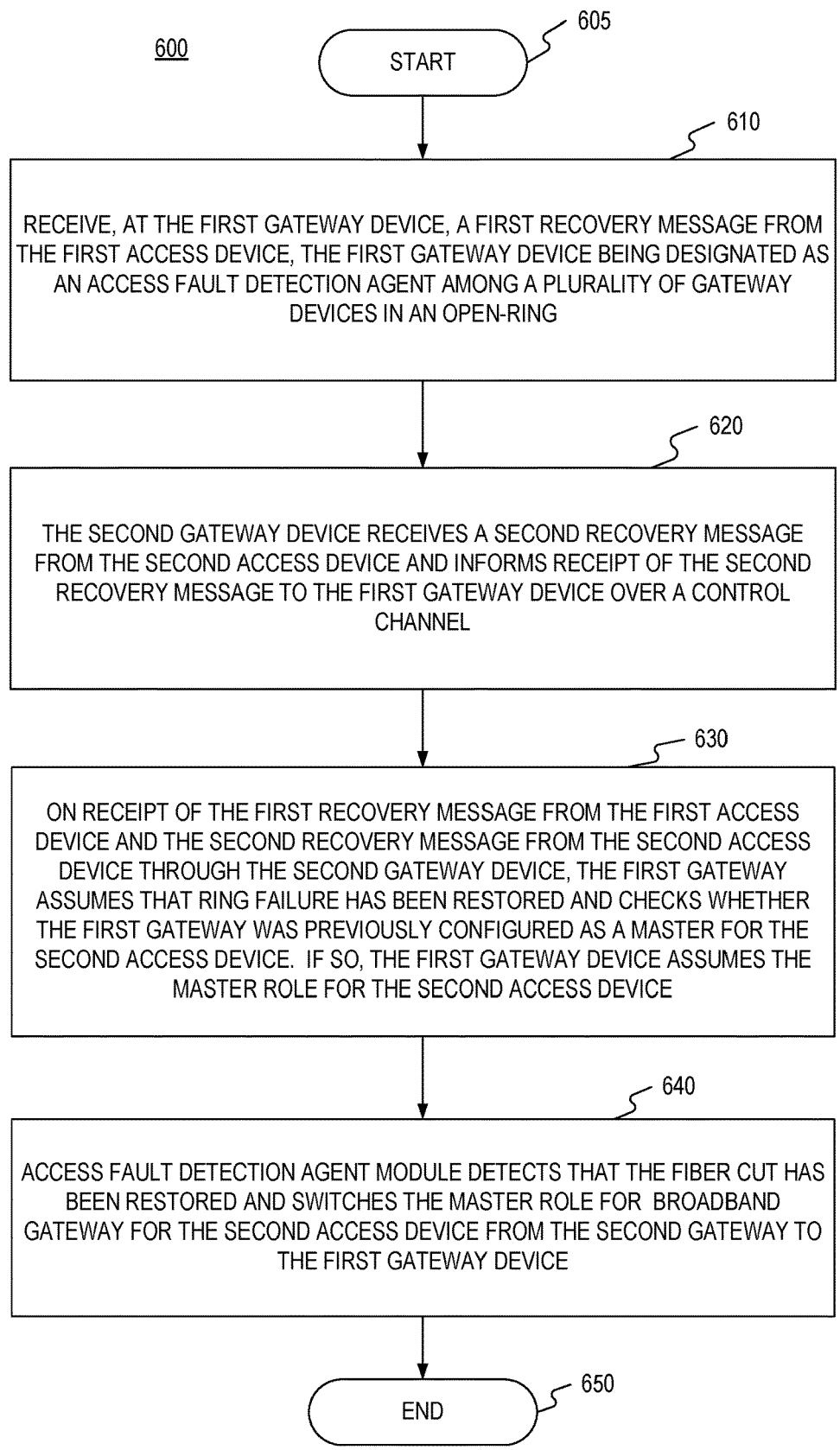
FIG. 6 is a flow chart of a method for providing fault recovery in a ring network.

FIG. 6 is a flow chart setting forth the general stages involved in a method 600 consistent with an embodiment of the disclosure for providing fault recovery in a ring network. Because first gateway device 115 may be designated as the access fault detection agent, method 600 may be implemented using first gateway device 115. Method 600 may be implemented using second gateway device 120 if it were designated as the access fault detection agent instead of first gateway device 115. Ways to implement the stages of method 600 will be described in greater detail below.

The block diagram of operating environment 100 of FIG. 5 may be used to illustrate method 600. Method 600 may describe a recovery process that may be used during restoration of fault 515. Fault 515 may be restored by a service crew for example. Prior to fault 515, broadband subscribers of second access device 130 may be terminated and accounted for in first gateway device 115 as a master broadband gateway and second gateway device 120 may be a standby broadband gateway. After fiber between first access device 125 and second access device 130 is faulted (i.e., fault 515 occurs), broadband sessions of subscribers of second access device 130 may no longer be terminated at first gateway device 115, hence broadband sessions may be switched to second gateway device 120 as described above.

After fault 515 is restored, nodes adjacent to first access device 125 (i.e., second access device 130) may detect a link up event through a physical link state up event or Continuity Check Message (CCM). Once the link up event is detected, first access device 125 and second access device 130 may generate R-APS NR (no request) messages throughout open ring 105.

RPL nodes generate R-APS, NR, NB messages towards all nodes in open ring. The RPL node and RPL neighbor nodes of open ring 105 may block RPL link. First gateway device 115 or second gateway device 120 or first access device 125 or fourth access device 140 in open ring 105 may be configured as an RPL node or RPL neighbor node interchangeably. First gateway device 115 may be configured as an "access fault detection agent". Second gateway device 120 may be configured as an "access fault detection agent" if first gateway device 115 is not configured as "access fault detection Agent".

Method 600 may begin at starting block 605 and proceed to stage 610 where first gateway device 115 may receive a first recovery message from first access device 125. First gateway device 115 may be designated as an access fault detection agent among the plurality of gateway devices in open-ring 105. For example, first gateway device 115 may snoop R-APS NR, NB messages sent on open ring 105 and treat it as a fiber restore event. Also it may monitor it's directly connected ring interface and check open ring 105 to see if it is in a protected state or not as an additional check.

From stage 610, where first gateway device 115 receives the first recovery message, method 600 may advance to stage 620 where second gateway device 120 may receive a second recovery message from second access device 130 and may inform receipt of the second recovery message to first gateway device 115 over control channel 170. For example, second gateway device 120 may receive/snoop R-APS, NR, NB messages in open ring 105 and treat it as a recovery message. Second gateway device 120 may send the recovery message to first gateway 115 through control channel 170.

Once second gateway device 120 receives the second recovery message from second access device 130 and informs receipt of the second recovery message to first gateway device 115 in stage 620, method 600 may continue to stage 630 where on receipt of the first recovery message from first access device 125 and second recovery message from second access device 130 through second gateway device 120, first gateway device 115 may assume that the ring failure (e.g., fault 515) has been restored and checks whether first gateway device 115 was previously configured as a master for second access device 130. If so, first gateway device 115 may assume the master role for second access device 130. For example, on receipt/snoop of R-APS NR, NB messages by first gateway device 115 and receipt of the fault recovery message sent by second gateway device 120 as described in stage 620, first gateway device 115 may determine that fault 515 has been restored.

After first gateway device 115 assumes that the ring failure has been restored in stage 630, method 600 may proceed to stage 640 where an access fault detection agent module detects that the fiber cut has been restored. The master role for the broadband gateway for second access device 130 may be switched from second gateway device 120 to first gateway device 115. For example, because fault 515 has been restored, first gateway device 115 may reach second access device 130 directly via open ring 105 through first access device 125. Because first gateway device 115 may be configured as "access fault detection agent", it may have information of topology, topologically information about first gateway device 115, second gateway device 120, and master and slave roles for each access device on open ring 105. Since first gateway device 115 may be configured as the master broadband gateway for second access device 130, first gateway device 115 may switch its role from slave to master for broadband subscribers from second access device 130 and may inform second gateway device 120 via control channel 170 so that second gateway device 120 switches it's role from master to slave for second access device 130. Once the master role for broadband gateway for second access device 130 has been switched from second gateway device 120 to first gateway device 115 in stage 640, method 600 may then end at stage 650.

Figure 7:
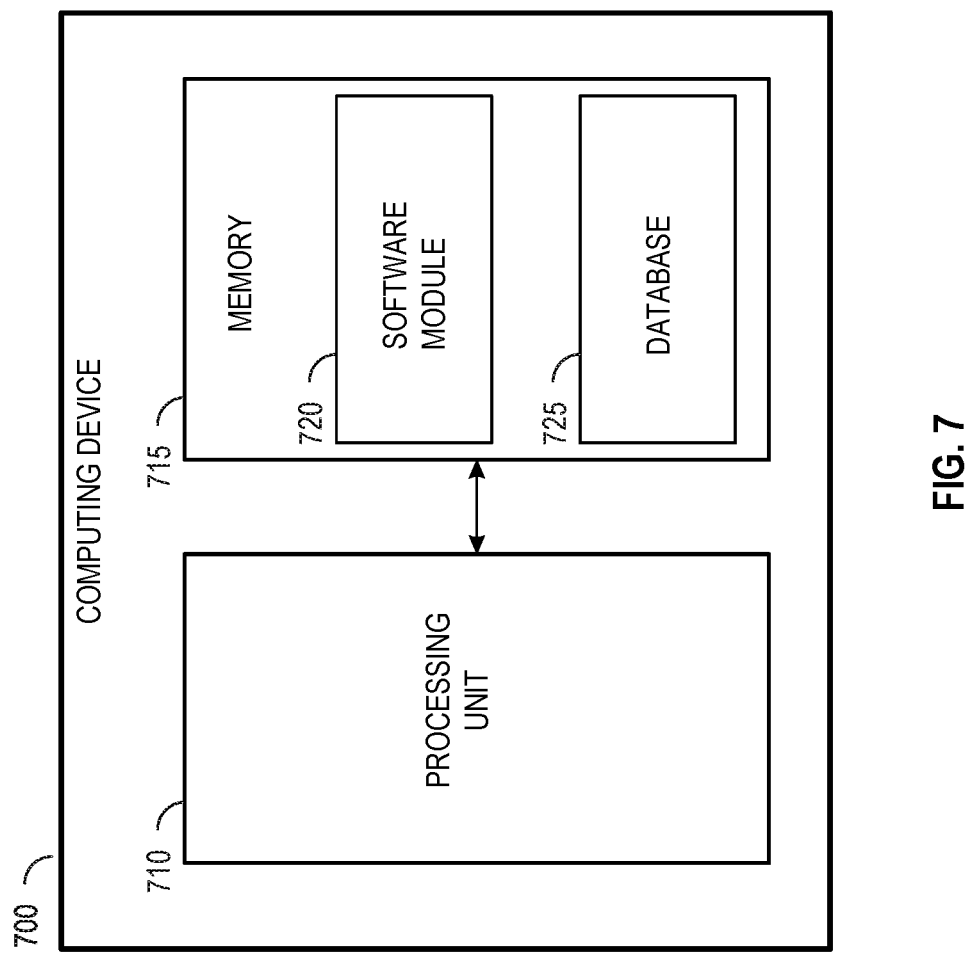
FIG. 7 is a block diagram of a computing device.

FIG. 7 shows computing device 700. As shown in FIG. 7, computing device 700 may include a processing unit 710 and a memory unit 715. Memory unit 715 may include a software module 720 and a database 725. While executing on processing unit 710, software module 720 may perform processes for providing broadband subscriber switchover in a ring network, including for example, any one or more of the stages from method 200 described above with respect to FIG. 2, any one or more of the stages from method 400 described above with respect to FIG. 4, and any one or more of the stages from method 600 described above with respect to FIG. 6. Computing device 700 may provide an operating environment for any one of more of plurality of gateway devices and plurality of access devices.

Computing device 700 may be implemented using, a BNG, an OLT, a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a camera, a load balancer, or other similar microcomputer-based device. Computing device 700 may comprise any computer operating environment, such as hand-held devices, multiprocessor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples and computing device 700 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality of which may be integrated (or "burned") onto the chip substrate as a single integrated circuit. When operating via an SOC, the functionality described herein with respect to embodiments of the disclosure, may be performed via application-specific logic integrated with other components of computing device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving, at a first gateway device, a first failure message from a first ring device, the first gateway device being designated as an access fault detection agent among a plurality of gateway devices in an open-ring;
    receiving, at the first gateway device, a second failure message from a second ring device, the second failure message being received via a second gateway device in the plurality of gateway devices, wherein the first ring device and the second ring device are in the open-ring;
    determining, by the first gateway device, that the first ring device has been cut off from the second gateway device based upon the first failure message and the second failure message, the second gateway device being a master device for the first ring device wherein determining that the first ring device has been cut off from the second gateway device comprises determining in response to failure of a third ring device between the first ring device and the second ring device; and
    switching the master device for the first ring device from the second gateway device to the first gateway device based on determining that the first ring device has been cut off from the second gateway device.

2. The method of claim 1, wherein the first failure message comprises an Automatic Protection Switching Signal Fail (R-APS SF) message.

3. The method of claim 1, wherein the second failure message comprises an Automatic Protection Switching Signal Fail (R-APS SF) message.

4. The method of claim 1, wherein the first gateway device comprises a Broadband Network Gateway (BNG).

5. The method of claim 1, wherein receiving, at the first gateway device, the second failure message from the second ring device, the second failure message being received via the second gateway device comprising a Broadband Network Gateway (BNG).

6. The method of claim 1, wherein receiving, at the first gateway device, the first failure message from the first ring device comprising an Optical Line Terminal (OLT).

7. The method of claim 1, wherein receiving, at the first gateway device, the second failure message from the second ring device comprising an Optical Line Terminal (OLT).

8. A method comprising:
receiving, at a first gateway device, a first failure message from a first ring device, the first gateway device being designated as an access fault detection agent among a plurality of gateway devices in an open-ring;
receiving, at the first gateway device, a second failure message from a second ring device, the second failure message being received via a second gateway device in the plurality of gateway devices, wherein the first ring device and the second ring device are in the open-ring;
determining, by the first gateway device, that the second ring device has been cut off from the first gateway device based upon the first failure message and the second failure message, the first gateway device being a master device for the second ring device wherein determining that the first ring device has been cut off from the second gateway device comprises determining in response to failure of a third ring device between the first ring device and the second ring device; and
switching the master device for the second ring device from the first gateway device to the second gateway device based on determining that the second ring device has been cut off from the first gateway device.

9. The method of claim 8, wherein the first failure message comprises an Automatic Protection Switching Signal Fail (R-APS SF) message.

10. The method of claim 8, wherein the second failure message comprises an Automatic Protection Switching Signal Fail (R-APS SF) message.

11. A system comprising:
a memory storage; and
a processing unit coupled to the memory storage, wherein the processing unit is operative to:
receive a first failure message from a first ring device, the processing unit being disposed in a first gateway device being designated as an access fault detection agent among a plurality of gateway devices in an open-ring;
receive a second failure message from a second ring device, the second failure message being received via a second gateway device in the plurality of gateway devices, wherein the first ring device and the second ring device are in the open-ring;
determine, by the first gateway device, that the first ring device has been cut off from the second gateway device based upon the first failure message and the second failure message, the second gateway device being a master device for the first ring device, wherein the processing unit being operative to determine that the first ring device has been cut off from the second gateway device comprises the processing unit being operative to determine that the first ring device has been cut off from the second gateway device in response to failure of a third ring device between the first ring device and the second ring device; and
switch the master device for the first ring device from the second gateway device to the first gateway device based on determining that the first ring device has been cut off from the second gateway device.

12. The system of claim 11, wherein the first gateway device comprises a Broadband Network Gateway (BNG).

13. The system of claim 11, wherein the second gateway device comprises a Broadband Network Gateway (BNG).

14. The system of claim 11, wherein the first ring device comprises an Optical Line Terminal (OLT).

15. The system of claim 11, wherein the second ring device comprises an Optical Line Terminal (OLT).

16. The system of claim 11, wherein the open-ring is optical.

* * * * *